UNITED STATES PATENT OFFICE.

EMIL BARELL, OF BASLE, SWITZERLAND, ASSIGNOR TO F. HOFFMANN-LA ROCHE & CO., OF SAME PLACE.

ORTHOGUAIACOL SULFO-ACID AND PROCESS OF MAKING SAME.

SPECIFICATION forming part of Letters Patent No. 650,218, dated May 22, 1900.

Application filed September 7, 1898. Serial No. 690,445. (Specimens.)

*To all whom it may concern:*

Be it known that I, EMIL BARELL, chemist and doctor of philosophy, a citizen of the Swiss Republic, residing in Basle, Switzerland, have invented new and useful Improvements in the Manufacture of Guaiacol Derivatives, (for which an application for a patent was filed in Germany, March 9, 1898,) of which the following is a complete, clear, and exact specification.

I have found that on treating guaiacol with concentrated sulfuric acid at a temperature of from 70° to 80° centigrade an orthoguaiacol-sulfoacid is obtained which crystallizes in form of white laminas, which may be employed for the treatment of tuberculosis. For the preparation of this crystallized orthoguaiacol-sulfoacid I proceed as follows: Molecular proportions of fused pure guaiacol and concentrated sulfuric acid or one part of guaiacol and one to three parts of concentrated sulfuric acid are mixed, being stirred the while, care being taken that the temperature does not rise above 70° to 80° centigrade. When the sulfonation is at an end, the excess of sulfuric acid is separated from the weak rose-colored mixture by the method usual for phenol-sulfonic acids—for example, by diluting with water, precipitating with barium carbonate, filtering, and washing the contents of the filter. From the solution of bariumguaiacol-sulfonate obtained in this way the free acid is isolated in dilute aqueous solution by adding dilute sulfuric acid or potassium sulfate. By evaporating the dilute aqueous solution of orthoguaiacol-sulfoacid thus obtained and refrigerating the resulting concentrated solution at a low temperature the orthoguaiacol-sulfoacid crystallizes out. This orthoguaiacol-sulfoacid has the formula

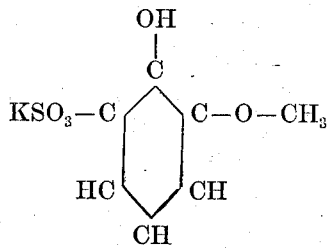

In chemically-pure state the orthoguaiacol-sulfoacid crystallizes in form of white laminas, which do not yet smelt at 270° centigrade, and dissolve in three to four parts of water of 15° centigrade and in about one part of boiling water. In alcohol the acid is hardly soluble; insoluble in ether, chloroform, benzene, acetone, &c. Concentrated sulfuric acid dissolves the acid without any color, also on heating. The taste of the pure acid is only slightly bitter, without recalling in any respect that of the guaiacol. The said acid has no caustic action on the mucous membranes and is employed for the treatment of tuberculosis in doses of 0.25 gram to one gram at once and of one to three grams per day. The acid reduces nitrate of silver already in the cold swifter on heating. With ferric chlorid the acid gives a blue coloration, which turns on addition of ammonia to bright yellow.

The potassic salt of the orthoguaiacol-sulfoacid is nearly insoluble in alcohol.

The orthoguaiacol-sulfoacid may also be employed for the manufacture of azo coloring-matters.

This orthoguaiacol-sulfoacid can also be prepared by mixing powdered or fused guaiacol with the above-prescribed proportions of concentrated sulfuric acid in the cold and finishing the sulfonation, which has already occurred to some extent, by heating at 70° to 80° centigrade.

What I claim is—

1. The process for the manufacture of crystallized orthoguaiacol-sulfoacid by treating pure guaiacol with concentrated sulfuric acid at a temperature of from 70° to 80° centigrade, isolating a solution of the barium salt of the guaiacol-sulfoacid thus formed, decomposing the aqueous solution of this barium salt with sulfuric acid, concentrating the solution of the orthoguaiacol-sulfoacid thus obtained and crystallizing this acid out by refrigerating its concentrated solution.

2. As a new article of manufacture the above-described crystallized orthoguaiacol-sulfoacid, which presents the form of small white laminas which do not melt up to 270° centigrade, which dissolves readily in water, but hardly in alcohol, is insoluble in ether, chloroform, benzene and acetone and gives with ferric chlorid a blue coloration turning on addition of ammonia to bright yellow.

In testimony that I claim the foregoing as my invention I have signed my name in presence of two subscribing witnesses.

EMIL BARELL.

Witnesses:
GEORGE GIFFORD,
AMAND RITTER.